Patented Sept. 30, 1952

2,612,484

UNITED STATES PATENT OFFICE 2,612,484

POLYMERIC TETRAFLUOROETHYLENE DISPERSIONS

Seymour George Bankoff, Terre Haute, Ind., assignor to E. I. du Pont de Nemours & Company, Wilmington, Del., a corporation of Delaware No Drawing. Application July 27, 1949, Serial No. 107,135

5 Claims. (Cl. 260—29.6)

This invention relates to polymeric tetrafluoroethylene dispersions and, more particularly, to an improved process for preparing aqueous colloidal dispersions of polytetrafluoroethylene.

Polytetrafluoroethylene in the form of an aqueous colloidal dispersion has been obtained by carrying out the polymerization of tetrafluoroethylene in aqueous medium in the presence of particular organic peroxide catalysts, such as disuccinic acid peroxide as disclosed in United States application Serial No. 713,385 filed November 30, 1946 in the name of Malcolm M. Renfrew, now United States Patent 2,534,058. A serious disadvantage of this procedure is that the colloid is unstable and is coagulated at very low polymer concentrations by the agitation necessary to dissolve the gaseous tetrafluoroethylene monomer in the aqueous medium. The result is that the desired colloidal polymer is obtained in a state of high dilution with the aqueous reaction medium, necessitating the handling of large amounts of water for a given amount of polymer. A method for overcoming this difficulty is described in United States application Serial No. 23,400, filed April 26, 1948, in the name of Kenneth L. Berry, refiled as Serial No. 225,677 on May 10, 1951, involving the use, as a stabilizer, during polymerization, of completely halogenated polyfluoroethylenes, i. e., fluid, saturated halocarbons which are highly inert and do not interfere chemically in the polymerization. However, the liquid halocarbons which are suitable for this purpose are not as readily available or as desirable for commercial use and are, therefore, expensive.

An object of the present invention is to provide an improved process for preparing aqueous colloidal dispersions of polytetrafluoroethylene. A further object is to provide such a process which is more economical and satisfactory than those heretofore known. Other objects will be apparent from the description of the invention given hereinafter.

The above objects are accomplished according to the present invention by the step of carrying out the polymerization of the monomeric tetrafluoroethylene dissolved in an aqueous medium in the presence of a water-soluble polymerization catalyst and in the presence of 0.1%–12%, by weight of the aqueous medium, of a saturated hydrocarbon having more than 12 carbon atoms and which is liquid under the polymerization conditions. It has been found that these particular hydrocarbons act as stabilizers and permit a surprising increase in the concentration of colloidal polytetrafluoroethylene in the aqueous dispersion before coagulation of the polymer takes place.

The polymerization of the tetrafluoroethylene in the aqueous medium containing the specified hydrocarbon and a water-soluble catalyst is carried out in accordance with the known general procedures. Pressures of from 1 to 1000 atmospheres and temperatures of 0° C. to 100° C. are normally used, as disclosed in United States Patent 2,393,967. Although optional, it is usually advantageous to include with the polymerization catalyst a polymerization promoter such as sodium bisulfite, especially when the polymerization is carried out at the lower temperatures in this range, i. e., from 0° C. to 50° C. In addition, a small amount of water-soluble ferrous salt, e. g., ferrous sulfate, is advantageously present in amount sufficient to provide from 0.2 to 50 parts per million of ferrous ions based on the weight of the aqueous medium, i. e., the water.

In a preferred procedure for carrying out the present invention, a reaction mixture comprising distilled or demineralized water to which has been added small amounts of ammonium persulfate or other water-soluble peroxy polymerization catalyst, sodium bisulfite, a trace of a ferrous iron salt, and 1%–5%, based on the weight of the aqueous medium, i. e., the water, of a saturated hydrocarbon of more than 12 carbon atoms which is liquid under the reaction conditions, is charged into a pressure vessel and the vessel is evacuated. Tetrafluoroethylene monomer is introduced until a suitable pressure, e. g., about 60 lbs./sq. in., is attained. The closed pressure vessel is then heated to about 50° C. with agitation and with continuous addition of sufficient tetrafluoroethylene to maintain the desired pressure until the colloidal polymer formed begins to coagulate. There results a colloidal dispersion of high molecular weight, film-forming, polymeric tetrafluoroethylene containing up to 15% of colloidal polymer.

The invention is illustrated in further detail by the following examples in which the proportions of the reactants are expressed in parts by weight unless otherwise specified.

*Example I*

Two hundred parts of distilled water, 0.1 part of ammonium persulfate, 0.05 part of sodium bisulfite, 0.002 part of ferrous sulfate heptahydrate and 2.3 parts of tetradecane are mixed in a pressure vessel (having a volume capacity of 325 parts of water at room temperature) and the mixture is maintained at 25° C. The vessel is evacuated to remove air and then pressured to 51 lbs./sq. in. with tetrafluoroethylene gas. The vessel is agitated for 1.2 hours during which time the pressure is maintained at the same value by the continual introduction of additional tetrafluoroethylene. At the end of this time there is obtained an aqueous dispersion of high molecular weight, film-forming polytetrafluoroethylene of 4.3% solids content.

A control experiment is conducted in an identical manner with the sole exception that the tetradecane is omitted. Coagulation of the polymer begins after twelve minutes and the agitation is then discontinued. There is obtained an aqueous polytetrafluoroethylene dispersion containing only 0.7% solids.

*Example II*

The process of Example I is repeated under the same conditions and with the same proportions of reactants with the single exception that 3.9 parts of cetane is substituted for the 2.3 parts of tetradecane of Example I. After 2.2 hours at 25° C. and under a tetrafluoroethylene pressure of 50 lbs./sq. in., there is obtained a colloidal dispersion of polytetrafluoroethylene containing 8.4% solids.

*Example III*

A pressure reactor having a volume capacity of 159 parts of water at room temperature, and fitted with an agitator capable of being rotated at 40 R. P. M., is charged with 113.6 parts of demineralized water, 0.076 part of disuccinic acid peroxide and 0.5 part of paraffin wax melting at 54° C.–58° C. The vessel is evacuated to remove air, pressured to 300–350 lbs./sq. in. with tetrafluoroethylene and heated to 65° C. with continuous agitation. After an induction period of 5 minutes and a reaction time of 55 minutes there is obtained a 5.8% solids dispersion of high molecular weight, film-forming polytetrafluoroethylene. The dispersion contains 6.56 parts of polytetrafluoroethylene which corresponds to a 95.3% conversion of the monomer to colloidal polymer.

*Example IV*

A mixture of 3000 parts of distilled water, 3 parts of disuccinic acid peroxide and approximately 320 parts of a high boiling mineral oil comprising a mixture of hydrocarbons having an average of 25–30 carbon atoms is charged into a reaction vessel fitted with a mechanical agitator. The reaction vessel is closed, heated to 65° C., pressured with tetrafluoroethylene at 300–351 lbs./sq. in., and the agitator rotated at a speed of 38 R. P. M. After two hours and 14 minutes there is obtained a dispersion of polytetrafluoroethylene containing 4.6% colloidal solid polymer.

It will be understood that the above examples are merely illustrative and that the invention broadly comprises polymerizing tetrafluoroethylene in an aqueous medium in the presence of a water-soluble polymerization catalyst, and in the presence of 0.1%–12%, by weight of the aqueous medium, of a saturated hydrocarbon having more than 12 carbon atoms and which is liquid under the polymerization conditions.

In addition to the specific hydrocarbon stabilizers of the examples, there may be mentioned as being particularly suitable such hydrocarbons having more than 12 carbon atoms, as octadecane, eicosane, the mixture of hydrocarbons sold commercially as white mineral oil, and other paraffin waxes having melting points below 100° C. Since the hydrocarbon must be liquid at the temperature of polymerization, obviously paraffin wax must be selected with due regard to its melting point so that it may meet this requirement. It is immaterial how many carbon atoms the hydrocarbon contains above 12 so long as it is liquid at the polymerization temperature. These hydrocarbons are added to the aqueous medium in proportions of from 0.1%–12% by weight based on the total weight of the aqueous medium. It is preferred to use a proportion of from 1%–5% of the hydrocarbon as best results are obtained within that range.

The effectiveness of the hydrocarbons of the above-defined carbon chain length in stabilizing colloidal dispersions of high molecular weight polytetrafluoroethylene is quite surprising. Furthermore, this effectiveness is dependent on the particular hydrocarbons and under the particular conditions defined herein. That is, these hydrocarbons are effective with tetrafluoroethylene only in aqueous polymerization systems, in the presence of water-soluble polymerization catalysts, and when the hydrocarbon is used in proportions of from 0.1% to not appreciably above 12% by weight of the reaction medium.

That the 12-carbon limitation of the hydrocarbon is critical, is evident from the results of the following experiments. In a series of experiments carried out similar to the process of Examples I and II but in which the tetradecane and cetane of those examples was replaced by dodecane, decane, isooctane and decahydronaphthalene, respectively, no polymerization took place at all in the presence of isooctane or decahydronaphthalene, and only very small amounts of coagulated, low molecular weight tetrafluoroethylene telomer waxes were obtained in the case of dodecane and decane. The effectiveness of the hydrocarbons having more than 12 carbon atoms in the process of this invention is apparently due to their low solubility in water. Even though these hydrocarbons are potentially telogenic, their water-solubility is so low that there is insufficient concentration of these hydrocarbons existing in the aqueous phase (which is the site of the tetrafluoroethylene polymerization) to inhibit the formation of a high molecular weight, solid tetrafluoroethylene polymer. On the other hand, the small amount of hydrocarbon present as a phase separate from the aqueous solution is sufficient to stabilize the colloidal dispersion of polytetrafluoroethylene against coagulation caused by the agitation necessary during polymerization.

These hydrocarbons are efficient stabilizing agents against coagulation and permit thorough agitation of the contents of the reaction vessel without danger of coagulation of the polymer at low concentrations. By the use of agitation, the polymerization cycle may be appreciably reduced in time. Also, at the end of the cycle, these hydrocarbons rise to the surface of the reaction mixture and thus facilitate their removal. An advantage in using paraffins solid at normal temperatures is that in separating and rising to the surface of the reaction mixture, they entrain and remove any coagulated polymer that may be formed, while leaving the colloidal particles of polymer in the aqueous medium.

The present invention is primarily concerned with the polymerization of tetrafluoroethylene. However, it is not restricted to the formation of homopolymers of tetrafluoroethylene as it is entirely operative and may be used advantageously in the formation of copolymers of tetrafluoroethylene with up to at most 50%, by weight of the tetrafluoroethylene, of other polymerizable compounds such as ethylene, isobutylene, trifluorochloroethylene, vinyl fluoride and vinylidine fluoride, vinyl acetate, acrylonitrile, and similar organic compounds copolymerizable with tetrafluoroethylene and containing a terminal carbon-to-carbon double bond.

The polymerization is carried out in the presence of a polymerization catalyst, such catalysts and the favorable proportions in which they are used, being known in the prior art. As the polymerization takes place in an aqueous medium, the catalyst must be water-soluble. It may be either an organic or inorganic compound as illustrated in the examples, the peroxy compounds being preferred. Numerous polymerization catalysts are disclosed in U. S. Patents 2,393,967 and 2,394,243 as well as in the aforementioned Renfrew application Serial No. 713,385. These catalysts are normally used in the proportion of 0.001% to 5%, based on the weight of tetrafluoroethylene employed, with a proportion of 0.01% to 2% preferred, although smaller or larger amounts may be used. Disuccinic acid peroxide is the preferred specific polymerization catalyst. Preferably, the air is removed from the reaction vessel before the start of the polymerization.

The dispersions of this invention are useful for fabricating the polymers into a variety of forms. Films can be cast by baking flow-outs, and in a similar manner coatings of the polymers can be applied to metal, fabrics, wood, ceramics and carbon. Coatings on metal in the form of wire, foils, materials-handling equipment such as chemical reactors and pipe lines, structural forms, and porous articles made by casting or powder metallurgy techniques, are of particular value for their inertness to moisture, corrosive chemicals, solvents and electrical and mechanical stresses. Impregnations are possible because of the small particle size of the polymers. Fabrics are advantageously impregnated to confer water repellency by the procedure disclosed in copending application Ser. No. 726,717, filed February 5, 1947 in the name of K. L. Berry now U. S. Patent 2,532,691, and glass fabrics impregnated and coated with the dispersions have unique stability and other desirable properties such as flexibility, high dielectric strength and impermeability. Coated glass fabrics prepared in this way can be used as fuel pump diaphragms and in the fashioning of resistor cores. Polytetrafluoroethylene-coated glass fabrics can also be laminated by heat and pressure to give stiffer products. Casting molds formed from the coated glass fabric by heat and pressure can be used as molds for low-melting metals. Coatings on carbon and ceramics confer moisture protection with resultant increase in surface resistivity and resistance to tracking by an electric arc. The dispersions are also useful as adhesives, particularly for polytetrafluoroethylene sheeting, mica, metals and ceramics. In particular, a polytetrafluoroethylene surface can be permanently joined to a solid substance by application of a dispersion of the type provided by this invention containing at least 10% of the polymer, drying the joint by heating at not more than 100° C. and subsequently heating the structure to above 327° C.

The hydrocarbon stabilizers of this invention may be used to advantage in combination with certain dispersing agents to give stable aqueous dispersions of colloidal tetrafluoroethylene of greatly increased concentrations, e. g., up to 60% concentration and higher. The combination of these hydrocarbon stabilizers with salts of polyfluorocarboxylic acids as dispersing agents is fully disclosed and claimed in U. S. application Serial No. 107,137, filed of even date herewith in the name of K. L. Berry and refiled on June 29, 1950 as Serial No. 171,241. Serial No. 171,241 was, in turn, refiled March 6, 1951 as Serial No. 214,233, this latter application having now issued as U. S. Patent 2,559,772. From 0.01% to 10%, by weight of the aqueous medium, of a salt of a polyfluorocarboxylic acid is added to the aqueous medium. The preferred polyfluorocarboxylate dispersing agents are the ammonium and alkali metal salts of acids having the formula $H(CF_2)_nCOOH$ wherein $n$ is an even number from 6 to 10. These salts may be prepared according to the method described in U. S. application Serial No. 65,065, filed December 13, 1948, by K. L. Berry, now issued as U. S. Patent 2,559,629. This method consists in oxidizing, with a permanganate as the oxidizing agent, a polyfluoroalkanol of the formula $H(CF_2)_nCH_2OH$, wherein $n$ is an even number from 6 to 10. These polyfluoroalkanols are themselves obtained by heating at a temperature between 75° C. and 350° C., in the presence of a free radical-producing catalyst, a mixture of methanol with tetrafluoroethylene, in accordance with the procedure described in U. S. application Serial No. 65,063, filed December 13, 1948, by R. M. Joyce, now issued as U. S. Patent 2,559,628.

In these tetrafluoroethylene polymerization systems involving the use of polyfluorocarboxylate dispersing agents, the paraffin waxes are the preferred hydrocarbon stabilizing agent and the polymerization is preferably carried out at about 70° C. in the absence of any activators such as bisulfite and ferrous ions. In this system the hydrocarbon functions to delay and minimize precoagulation during the polymerization. Even if a paraffin wax is not used, it is preferred to use a higher molecular weight hydrocarbon, i. e., hydrocarbons of more than 16 carbon atoms. These higher molecular weight hydrocarbons give better results apparently because the fluorocarboxylate exerts some solubilizing effect on the hydrocarbon stabilizers of lower molecular weight.

As many apparently widely different embodiments of this invention may be made without departing from the spirit and scope thereof, it is to be understood that the invention is not limited to the specific embodiments thereof except as defined in the appended claims.

The invention claimed is:

1. In a polymerization of monomeric tetrafluoroethylene dissolved in an aqueous medium to obtain a colloidal dispersion of polymeric tetrafluoroethylene, the step of carrying out said polymerization at a temperature of 0° C. to 100° C. in the presence of a water-soluble peroxy polymerization catalyst and in the presence of 0.1%–12%, by weight of said aqueous medium, of a saturated hydrocarbon having more than 12 carbon atoms and which is liquid under the polymerization conditions.

2. Process as set forth in claim 1 wherein said saturated hydrocarbon is a paraffin wax having a melting point below the temperature at which said polymerization is carried out.

3. Process as set forth in claim 1 wherein said saturated hydrocarbon is present in the amount of 1%–5% by weight of said aqueous medium.

4. Process as set forth in claim 3 wherein said saturated hydrocarbon is a paraffin wax having a melting point below the temperature at which said polymerization is carried out.

5. Process as set forth in claim 4 wherein said water-soluble polymerization catalyst is disuccinic acid peroxide.

SEYMOUR GEORGE BANKOFF.

REFERENCES CITED

The following references are of record in the file of this patent:

UNITED STATES PATENTS

| Number | Name | Date |
|---|---|---|
| 2,393,967 | Brubaker | Feb. 5, 1946 |
| 2,394,243 | Joyce, Jr. | Feb. 5, 1946 |
| 2,398,926 | Dorough | Apr. 23, 1946 |
| 2,534,058 | Renfrew | Dec. 12, 1950 |